United States Patent
Wada

(10) Patent No.: US 10,785,402 B2
(45) Date of Patent: Sep. 22, 2020

(54) IMAGING DEVICE AND FOCUSING CONTROL METHOD OF IMAGING DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/824,072

(22) Filed: Mar. 19, 2020

(65) Prior Publication Data

US 2020/0221016 A1  Jul. 9, 2020

Related U.S. Application Data

(63) Continuation of application No. PCT/JP2018/032913, filed on Sep. 5, 2018.

(30) Foreign Application Priority Data

Sep. 20, 2017 (JP) ................ 2017-180244

(51) Int. Cl.
 *H04N 5/235* (2006.01)
 *G02B 7/09* (2006.01)
 (Continued)

(52) U.S. Cl.
 CPC ........... *H04N 5/23212* (2013.01); *G02B 7/09* (2013.01); *G03B 13/36* (2013.01); *H04N 5/2253* (2013.01); *H04N 5/2356* (2013.01); *G02B 7/282* (2013.01)

(58) Field of Classification Search
 CPC ............. H04N 5/23212; H04N 5/2356; H04N 5/2253; G02B 7/09; G02B 7/282; G03B 13/36
 See application file for complete search history.

(56) References Cited

U.S. PATENT DOCUMENTS 4,924,317 A * 5/1990 Hirao ................. H04N 5/23212
 348/351
5,416,519 A * 5/1995 Ohtake .................. G02B 7/282
 348/347
(Continued)

FOREIGN PATENT DOCUMENTS

JP      63-93277 A    4/1988
JP   2006-145813 A    6/2006
(Continued)

OTHER PUBLICATIONS

International Search Report for PCT/JP2018/032913 dated Dec. 4, 2018.

(Continued)

*Primary Examiner* — Hung H Lam
(74) *Attorney, Agent, or Firm* — Birch, Stewart, Kolasch & Birch, LLP

(57) ABSTRACT

Provided are an imaging device capable of accelerating AF and a focusing control method thereof. A focus lens drive unit (16) that drives a focus lens (12), and an image sensor movement drive unit (120) that moves an image sensor (110) along an optical axis (L) are included. A target position of the focus lens (12) for focusing on a subject is set, and the focus lens (12) is moved toward the target position. The image sensor (110) is moved before the focus lens (12) reaches the target position such that focusing is performed. A focusing state is maintained by moving the image sensor (110) so as to follow the focus lens (12) after the focusing is performed.

11 Claims, 13 Drawing Sheets

(51) Int. Cl.
   *H04N 5/232*   (2006.01)
   *G03B 13/36*   (2006.01)
   *H04N 5/225*   (2006.01)
   *G02B 7/28*    (2006.01)

(56) References Cited

U.S. PATENT DOCUMENTS

| | | | |
|---|---|---|---|
| 5,969,760 A * | 10/1999 | Ernest | G02B 7/28 |
| | | | 348/219.1 |
| 6,689,998 B1 | 2/2004 | Bremer | |
| 8,526,806 B2 * | 9/2013 | Kikuchi | G03B 17/14 |
| | | | 396/91 |
| 9,420,185 B2 * | 8/2016 | Oh | H04N 5/23287 |
| 9,918,004 B2 * | 3/2018 | Inata | H04N 5/2253 |
| 2006/0110150 A1 | 5/2006 | Kurosawa | |
| 2012/0044409 A1 | 2/2012 | Uchiyama | |
| 2014/0146219 A1 * | 5/2014 | Kawamura | H04N 5/2356 |
| | | | 348/349 |

FOREIGN PATENT DOCUMENTS

| | | |
|---|---|---|
| JP | 2007-148242 A | 6/2007 |
| JP | 2011-253134 A | 12/2011 |
| JP | 2012-42724 A | 3/2012 |
| JP | 2013-218063 A | 10/2013 |

OTHER PUBLICATIONS

Written Opinion of the International Searching Authority for PCT/JP2018/032913 dated Dec. 4, 2018.

\* cited by examiner

IMAGING DEVICE AND FOCUSING CONTROL METHOD OF IMAGING DEVICE

CROSS-REFERENCE TO RELATED APPLICATIONS

The present application is a Continuation of PCT International Application No. PCT/JP2018/032913 filed on Sep. 5, 2018 claiming priority under 35 U.S.C § 119(a) to Japanese Patent Application No. 2017-180244 filed on Sep. 20, 2017. Each of the above applications is hereby expressly incorporated by reference, in its entirety, into the present application.

BACKGROUND OF THE INVENTION

1. Field of the Invention

The present invention relates to an imaging device and a focusing control method thereof.

2. Description of the Related Art

Autofocus (AF) of an imaging device is performed by detecting a focus state by using a phase difference or contrast and moving a focus lens based on a detection result. Alternatively, the AF is performed by measuring a distance to a subject by irradiating infrared rays or ultrasonic waves and moving the focus lens based on a measurement result.

In order to accelerate the AF, it is necessary to move the focus lens at a high speed. However, in a case where the focus lens is moved at a high speed, there is a problem that overshoot occurs at the time of stopping the focus lens. In order to solve this problem, JP1988-093277A (JP-S63-093277A) and JP2006-145813A suggest a method of moving an image sensor so as to cancel the overshoot at the time of stopping the focus lens.

SUMMARY OF THE INVENTION

It is necessary to move the focus lens at a higher speed in order to further accelerate the AF by the methods described in JP1988-093277A (JP-S63-093277A) and JP2006-145813A. However, there is a limit to a speed at which the AF can be accelerated. Since t large motor and a large amount of electric power are required in order to move the focus lens at a higher speed, there is a problem that the devices become large and power consumption increases.

The present invention has been made in view of such circumstances, and an object of the present invention is to provide an imaging device capable of accelerating AF and a focusing control method thereof.

Means for solving the aforementioned problems are as follows.

(1) An imaging device comprises an imaging lens that includes a focus lens, a focus lens drive unit that drives the focus lens, an image sensor, an image sensor movement drive unit that moves the image sensor along an optical axis, a driving target setting unit that sets a driving target of the focus lens for focusing on a subject, a focus lens drive controller that controls the driving of the focus lens based on the driving target set by the driving target setting unit, and an image sensor movement controller that performs control such that focusing is performed by moving the image sensor before the focus lens drive controller stops the driving of the focus lens and a focusing state is maintained by moving the image sensor until the focus lens is stopped after the focusing is performed.

According to the present aspect, in a case where the focus lens is driven in order to focus on the subject, the image sensor moves before the driving is stopped, and the focusing is early performed. Even after the focusing is performed, the image sensor moves and the focusing state is maintained until the focus lens is stopped. Accordingly, a time to perform the focusing can be shortened, and AF can be accelerated.

(2) In the imaging device according to (1), the focus lens drive unit moves the focus lens along the optical axis, the driving target setting unit sets, as the driving target, a target position of the focus lens for focusing on the subject, and the focus lens drive controller controls the focus lens drive unit to move the focus lens to the target position.

According to the present aspect, a focus of the imaging lens is adjusted by moving the focus lens along the optical axis. The driving target is set as the target position of the focus lens for focusing on the subject. The focus lens drive controller moves the focus lens to the target position. The image sensor movement controller moves the image sensor before the focus lens reaches the target position such that the focusing is performed. After the focusing is performed, the image sensor is moved so as to follow or synchronize with the movement of the focus lens, and the focusing state is maintained.

(3) The imaging device according to (1) or (2) further comprises an autofocus sensor of a passive method or an active method, and the driving target setting unit sets the driving target based on an output of the autofocus sensor.

According to the present aspect, the autofocus sensor of the passive method or active method is provided, and the driving target of the focus lens for focusing on the subject is set based on the output of the autofocus sensor.

(4) In the imaging device according to (3), the autofocus sensor is a phase difference detection type autofocus sensor.

According to the present aspect, the phase difference detection type autofocus sensor is provided, and the driving target of the focus lens for focusing on the subject is set based on the output of the phase difference detection type autofocus sensor.

(5) In the imaging device according to (4), the autofocus sensor includes a plurality of phase difference detection pixels formed on an imaging surface of the image sensor.

According to the present aspect, the phase difference detection type autofocus sensor includes the plurality of phase difference detection pixels provided on the imaging surface of the image sensor. That is, the focus state is detected by the image plane phase difference type, and the driving target of the focus lens is set based on the detection result. The defocus direction and amount can be directly detected even while the image sensor is moving by employing the image plane phase difference type. Accordingly, the control of the movement of the image sensor can be further simplified.

(6) In the imaging device according to any one of (1) to (5), a reference position of the image sensor is set at a flange back position defined by the imaging lens.

According to the present aspect, the reference position of the image sensor is set at the flange back position defined by the imaging lens. Accordingly, the optical performance of the imaging lens can be maximized. The "flange back position" mentioned herein includes a position substantially regarded as a flange back position, that is, a position regarded as a substantially flange back position.

(7) In the imaging device according to (2), the focus lens drive controller decelerates the focus lens before the focus lens is stopped at the target position.

According to the present aspect, the focus lens is decelerated at the time of stopping the driving of the focus lens. Accordingly, the occurrence of the overshoot can be prevented.

(8) In the imaging device according to (7), the image sensor movement controller moves the image sensor such that the focusing is performed before the focus lens is decelerated.

According to the present aspect, the image sensor starts to move before the focus lens is decelerated. Accordingly, a time to perform the focusing can be shortened, and AF can be accelerated.

(9) In the imaging device according to any one of (1) to (8), the image sensor movement controller moves the image sensor simultaneously with start of the driving of the focus lens.

According to the present aspect, the movement of the image sensor is started simultaneously with start of the driving of the focus lens. Accordingly, a time to perform the focusing can be shortened, and AF can be accelerated. Here, "simultaneous" includes a range that can be regarded as substantially simultaneous. That is, the movement of the image sensor may be started almost simultaneously with start of the driving of the focus lens.

(10) In the imaging device according to any one of (1) to (9), the image sensor movement controller moves the image sensor to an end portion of a movable range such that the image sensor stands by at the end portion.

According to the present aspect, the image sensor moves so as to stand by at the end portion of the movable range. Accordingly, a time to perform the focusing can be shortened, and AF can be accelerated.

(11) A focusing control method of an imaging device that includes an imaging lens which includes a focus lens, a focus lens drive unit which drives the focus lens, an image sensor, and an image sensor movement drive unit which moves the image sensor along an optical axis. The method comprises a step of setting a driving target of the focus lens for focusing on a subject, a step of driving the focus lens based on the set driving target, and a step of performing control such that focusing is performed by moving the image sensor before the driving of the focus lens is stopped and a focusing state is maintained by moving the image sensor until the focus lens is stopped after the focusing is performed.

According to the present aspect, in a case where the focus lens is driven in order to focus on the subject, the image sensor moves before the driving is stopped, and the focusing is early performed. Even after the focusing is performed, the image sensor moves and the focusing state is maintained until the focus lens is stopped. Accordingly, a time to perform the focusing can be shortened, and AF can be accelerated.

According to the present invention, AF can be accelerated.

DESCRIPTION OF THE PREFERRED EMBODIMENTS

Hereinafter, preferred embodiments for carrying out the present invention will be described in detail with reference to the accompanying drawings.

[Overall Configuration]

Figure 1:
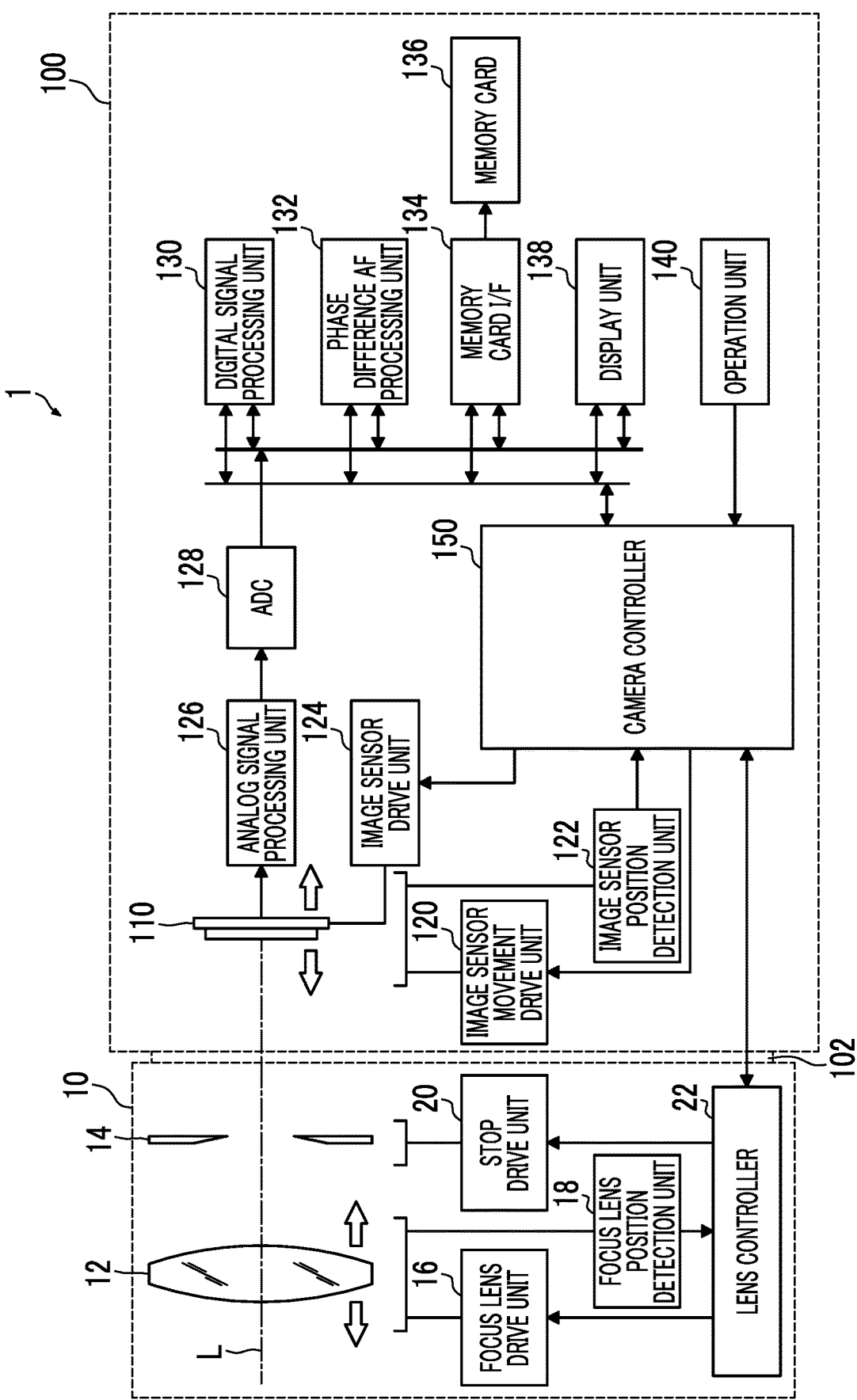
FIG. 1 is a schematic configuration diagram showing an embodiment of a digital camera to which the present invention is applied.

FIG. 1 is a schematic configuration diagram showing an embodiment of a digital camera to which the present invention is applied.

A digital camera 1 shown in this diagram is an interchangeable lens type digital camera, and comprises an interchangeable lens 10 and a camera main body 100.

<<Interchangeable Lens>>

An interchangeable lens 10 is an example of an imaging lens. The interchangeable lens 10 is attachable and detachable to and from the camera main body 100 via a mount 102. The interchangeable lens 10 is a combination of a plurality of lenses. The interchangeable lens 10 includes a focus lens 12 and a stop 14. A focus of the interchangeable lens 10 is adjusted by moving the focus lens 12 back and forth along an optical axis L. The amount of light is adjusted by adjusting the amount of an opening of the stop 14.

The interchangeable lens 10 comprises a focus lens drive unit 16 that drives the focus lens 12 and a focus lens position detection unit 18 that detects a position of the focus lens 12.

The focus lens drive unit 16 comprises, for example, an actuator such as a linear motor and a drive circuit thereof, and moves the focus lens 12 back and forth along the optical axis L.

The focus lens position detection unit 18 includes, for example, a photo interrupter and a magneto resistive (MR) sensor. The photo interrupter detects that the focus lens 12 is located at a predetermined origin position. The MR sensor detects the amount of movement of the focus lens 12. The MR sensor can detect the position of the focus lens 12 relative to the origin position by detecting that the focus lens 12 is located at the origin position by the photo interrupter and detecting the amount of movement of the focus lens 12 from the origin position by the MR sensor.

The interchangeable lens 10 comprises a stop drive unit 20 that drives the stop 14. The stop 14 is, for example, an iris stop. The stop drive unit 20 comprises a motor that drives stop leaf blades of the iris stop and a drive circuit thereof.

The interchangeable lens 10 comprises a lens controller 22 that controls driving of the focus lens drive unit 16 and the stop drive unit 20. The lens controller 22 is, for example, a microcomputer, and functions as a focus lens drive controller and a stop drive controller by executing a predetermined control program. The focus lens drive controller controls the driving of the focus lens drive unit 16. The stop drive controller controls the driving of the stop drive unit 20. The lens controller 22 is communicably connected to a camera controller 150 of the camera main body 100 via a communication terminal (not shown) provided at the mount 102.

<<Camera Main Body>>

The camera main body 100 comprises an image sensor 110, an image sensor movement drive unit 120, an image sensor position detection unit 122, an image sensor drive unit 124, an analog signal processing unit 126, an analog-to-digital converter (ADC) 128, a digital signal processing unit 130, a phase difference AF processing unit 132, a memory card interface 134, a memory card 136, a display unit 138, an operation unit 140, and a camera controller 150.

<Image Sensor>

The image sensor 110 receives light passing through the interchangeable lens 10, and images a subject. The image sensor 110 includes a solid-state imaging element such as a charged coupled device (CCD) or a complementary metal oxide semiconductor (CMOS). The image sensor 110 has a plurality of phase difference detection pixels on an imaging surface.

Figure 2:
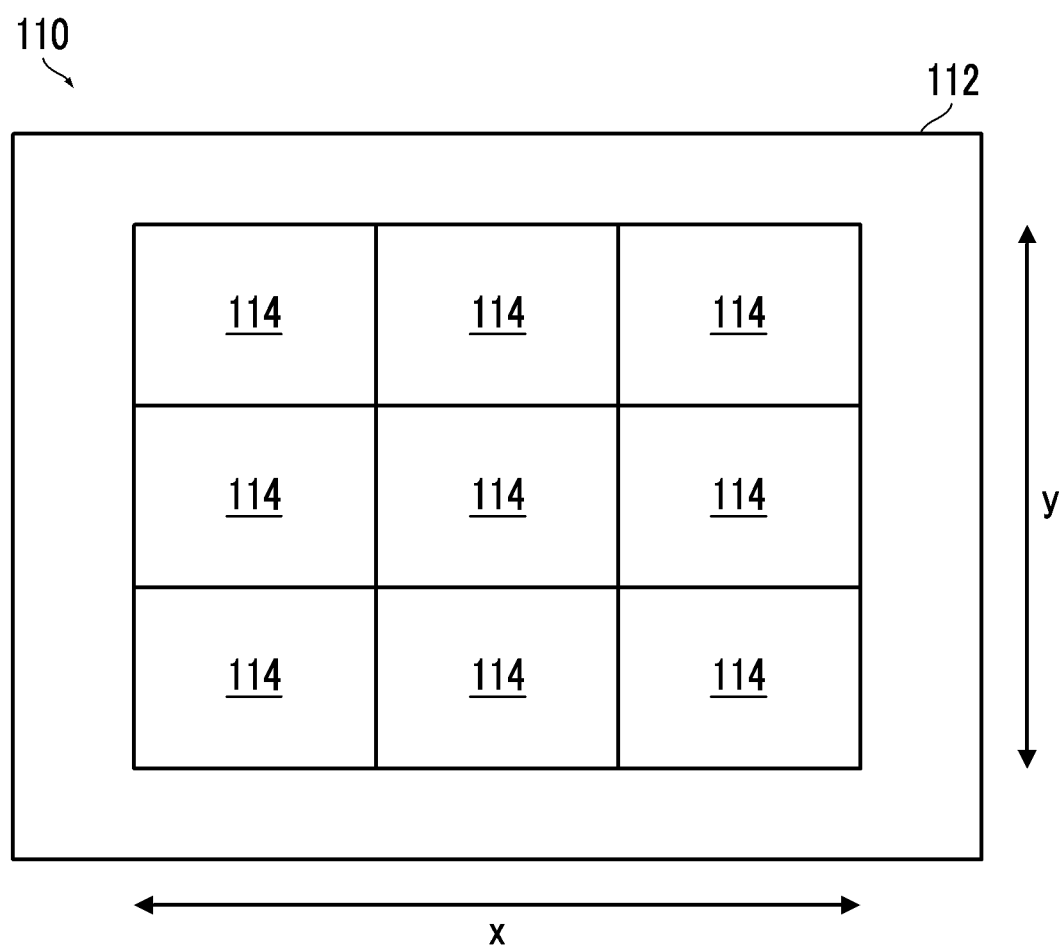
FIG. 2 is a diagram showing a schematic configuration of an image sensor.

FIG. 2 is a diagram showing a schematic configuration of the image sensor.

The image sensor 110 has an imaging surface 112 on which a plurality of pixels is two-dimensionally arranged in an x direction (row direction) and a y direction (column direction). The imaging surface 112 has a plurality of AF (autofocus) areas 114. The AF area 114 is an area set on the imaging surface 112 as an area that can be focused. In the example shown in FIG. 2, nine AF areas 114 are set at a central portion of a screen.

Figure 3:
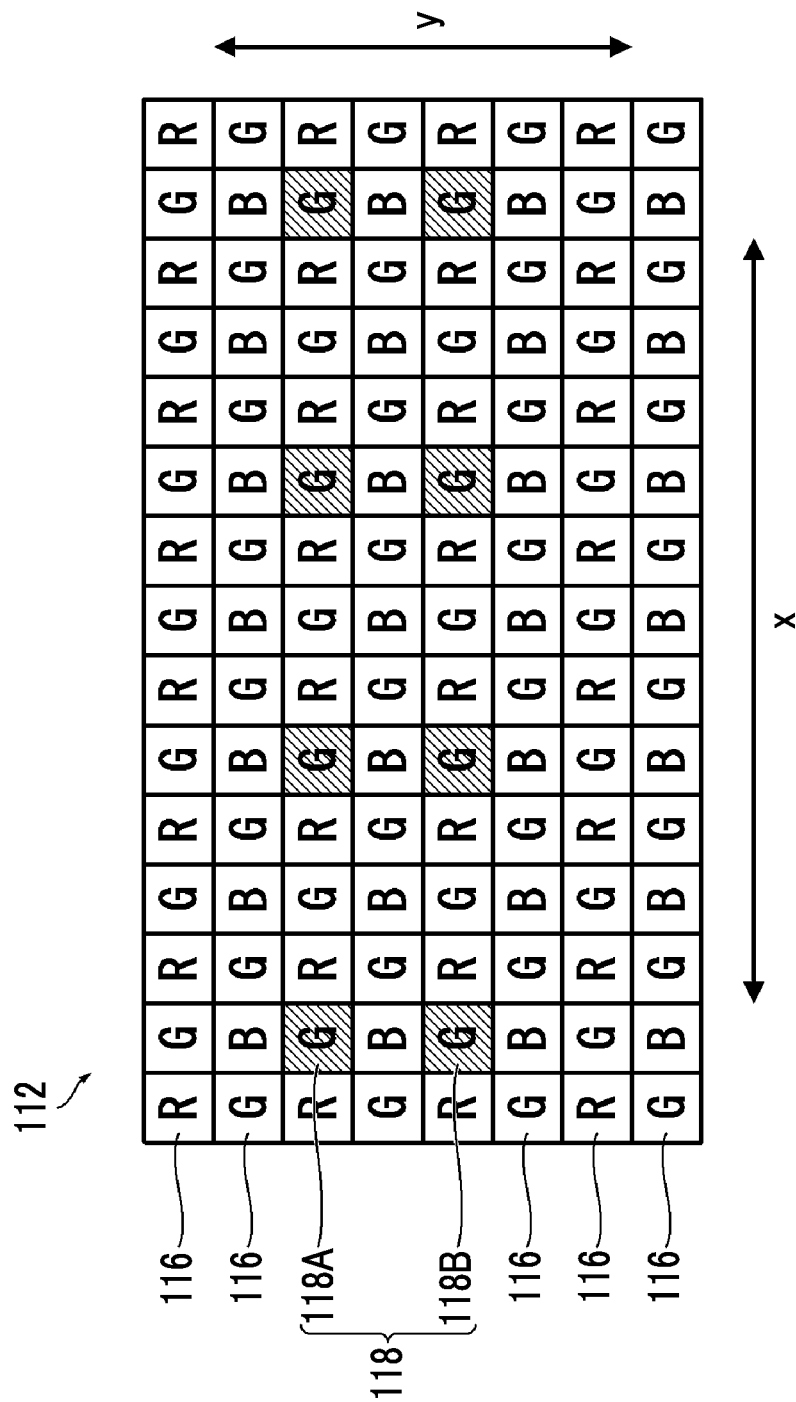
FIG. 3 is an enlarged view of a part of an imaging surface.

FIG. 3 is an enlarged view of a part of the imaging surface.

The plurality of pixels is regularly arranged on the imaging surface 112. Each pixel comprises a photoelectric conversion unit and outputs a signal corresponding to the amount of received light. Each pixel has a color filter of any of red (R), green (G), and blue (B). The color filters are assigned to the pixels so as to have a predetermined arrangement. FIG. 3 shows an example of a Bayer array. In this diagram, a letter R is given to a pixel (R pixel) having the color filter of R, a letter G is given to a pixel (G pixel) having the color filter of G, and a letter B is given to a pixel (B pixel) having the color filter of B.

Normal pixels 116 and phase difference detection pixels 118 are arranged in the AF area. The normal pixel 116 is a normal imaging pixel. The phase difference detection pixel 118 is a pixel that detects a phase difference. The phase difference detection pixel 118 is an example of a phase difference detection type autofocus sensor. The pixels other than the phase difference detection pixels are the normal pixels. Only the normal pixels are arranged in areas other than the AF areas.

In FIG. 3, the phase difference detection pixels 118 are indicated by diagonal lines. As shown in this diagram, the phase difference detection pixels 118 are regularly arranged on the imaging surface 112.

The phase difference detection pixels 118 include first phase difference detection pixels 118A and second phase difference detection pixels 118B. The first phase difference detection pixels 118A and the second phase difference detection pixels 118B are arranged close to each other. In the example shown in FIG. 3, the first phase difference detection pixels 118A are arranged at regular intervals in one of two rows of the same array adjacent to each other, and the second phase difference detection pixels 118B are arranged at regular intervals on the other row. In particular, an example in which specific G pixels in a specific row in which the R pixels and the G pixels are arranged are used as the phase difference detection pixels is shown.

Figure 4:
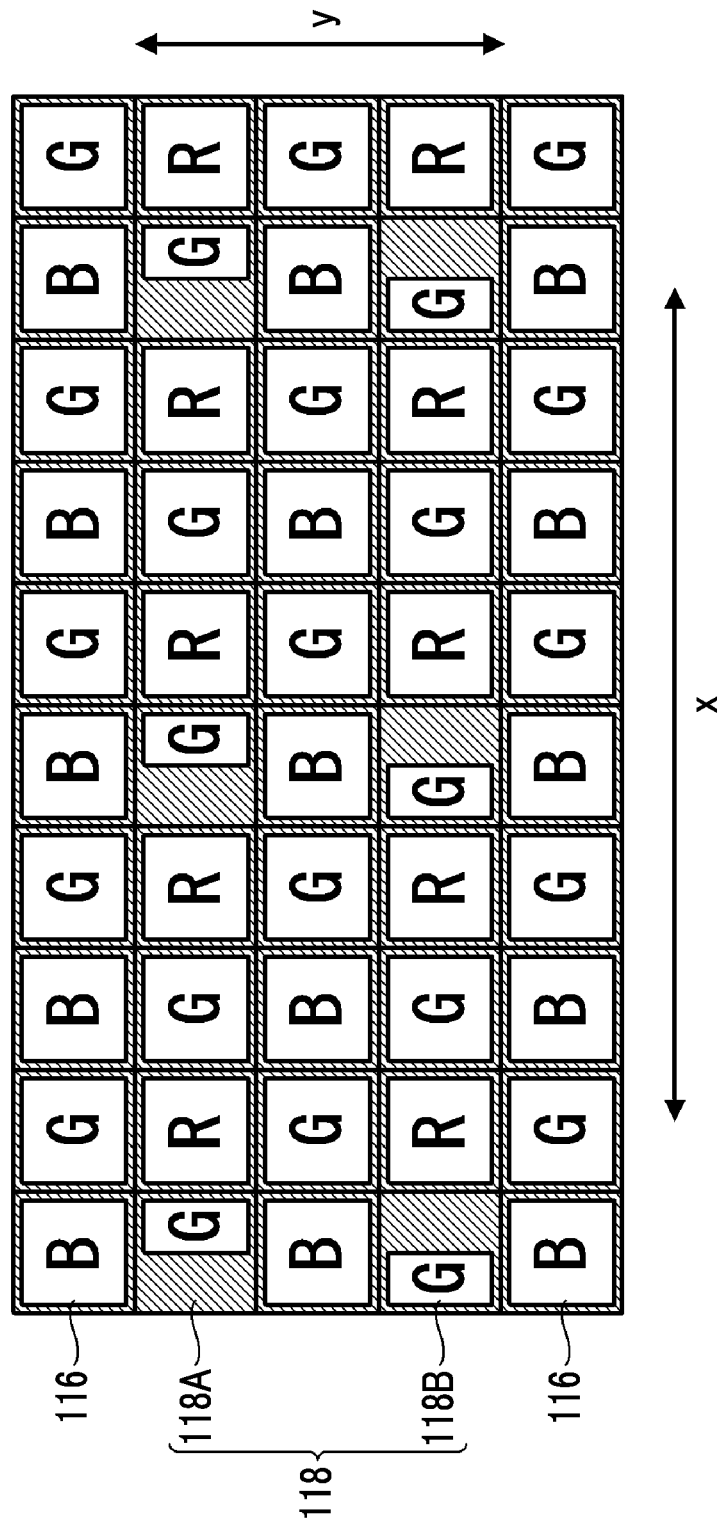
FIG. 4 is a diagram showing a schematic configuration of pixels.

FIG. 4 is a diagram showing a schematic configuration of each pixel.

Each pixel has a light shielding film comprising a predetermined opening portion. In FIG. 4, the opening portion of the light shielding film formed in each pixel is represented in white.

The normal pixel 116 has a light shielding film of which an opening portion coincides with a center of the photoelectric conversion unit. The normal pixel 116 receives light rays passed through almost the entire pupil region of the interchangeable lens 10.

The first phase difference detection pixel 118A has a light shielding film of which an opening portion is eccentric to a right side with respect to the center of the photoelectric conversion unit. As a result, the first phase difference detection pixel 118A receives one of a pair of light rays passed through different portions of the pupil region of the interchangeable lens 10.

The second phase difference detection pixel 118B has a light shielding film of which an opening portion is eccentric to a left side with respect to the center of the photoelectric conversion unit. As a result, the second phase difference detection pixel 118B receives the other of the pair of light rays passed through the different portions of the pupil region of the interchangeable lens 10.

With the aforementioned configuration, it is possible to detect a phase difference amount by acquiring signals of the first phase difference detection pixel 118A and the second phase difference detection pixel 118B and comparing these pixels.

<Image Sensor Movement Drive Unit>

The image sensor movement drive unit 120 moves the image sensor 110 back and forth along the optical axis L. The image sensor movement drive unit 120 comprises, for example, an actuator such as a piezo actuator and a drive circuit thereof.

The image sensor 210 moves within a movable range, and a reference position is set at a center of the movable range. The reference position is set at a flange back position defined by the interchangeable lens 10. In general, the interchangeable lens 10 is optically designed by using the flange back position as a reference. Therefore, the optical performance of the interchangeable lens 10 can be maximized by positioning the image sensor 110 at the reference position.

For example, a flange back of an interchangeable lens employing a C mount is 17.526 mm. A flange back of an interchangeable lens employing a CS mount is 12.5 mm.

<Image Sensor Position Detection Unit>

The image sensor position detection unit 122 detects the position of the image sensor 110 relative to the reference position. The image sensor position detection unit 122 includes, for example, a displacement sensor such as an eddy current sensor.

<Image Sensor Drive Unit>

The image sensor drive unit 124 drives the image sensor 110 under the control of the camera controller 150. The image sensor 110 is driven by the image sensor drive unit 124 to image an image.

<Analog Signal Processing Unit>

The analog signal processing unit 126 acquires an analog image signal for each pixel output from the image sensor 110, and performs predetermined signal processing (for example, sampling two correlation pile and amplification processing).

<ADC>

The ADC 128 converts the analog image signals output from the analog signal processing unit 126 into digital image signals, and outputs the digital image signals.

<Digital Signal Processing Unit>

The digital signal processing unit 130 acquires the digital image signals, and generates image data by performing predetermined signal processing (for example, gradation transformation processing, white balance correction processing, gamma-correction processing, demosaicing processing, and YC conversion processing).

<Phase Difference AF Processing Unit>

The phase difference autofocus (AF) processing unit 132 acquires the signals of the first phase difference detection pixels 118A and the second phase difference detection pixels 118B from the AF area 114 designated by a user, and calculates the phase difference amount by performing correlation calculation processing on the acquired signals. A defocus direction and amount are calculated based on the calculated phase difference amount.

<Memory Card Interface and Memory Card>

The memory card interface 134 reads and writes data from and in the memory card 136 attached to a card slot under the control of the camera controller 150.

<Display Unit>

The display unit 138 displays various information items including images. The display unit 138 comprises a display device such as a liquid crystal display and an organic electroluminescent (EL) display, and a drive circuit thereof.

In addition to the captured image, a live view is displayed on the display unit 138. The live view is a function of displaying an image captured by the image sensor 110 in real time. It is possible to image an image while confirming the image on the display unit 138 by displaying the live view. The display unit 138 is also used as a user interface at the time of performing various settings.

<Operation Unit>

The operation unit 140 is general operation means as a digital camera, such as a release button, a power switch, an imaging mode dial, a shutter speed dial, an exposure correction dial, a command dial, a menu button, a cross key, an enter button, a cancel button, and a delete button, and outputs a signal corresponding to an operation to the camera controller 150.

The release button is a two-stroke type button capable of being pushed halfway and fully, and outputs an S1ON signal at the time of being pushed halfway and an S2ON signal at the time of being pushed fully.

<Camera Controller>

The camera controller 150 is a controller that generally controls the entire operation of the digital camera 1. The camera controller 150 includes, for example, a microcomputer, and provides various functions by executing predetermined programs.

Figure 5:
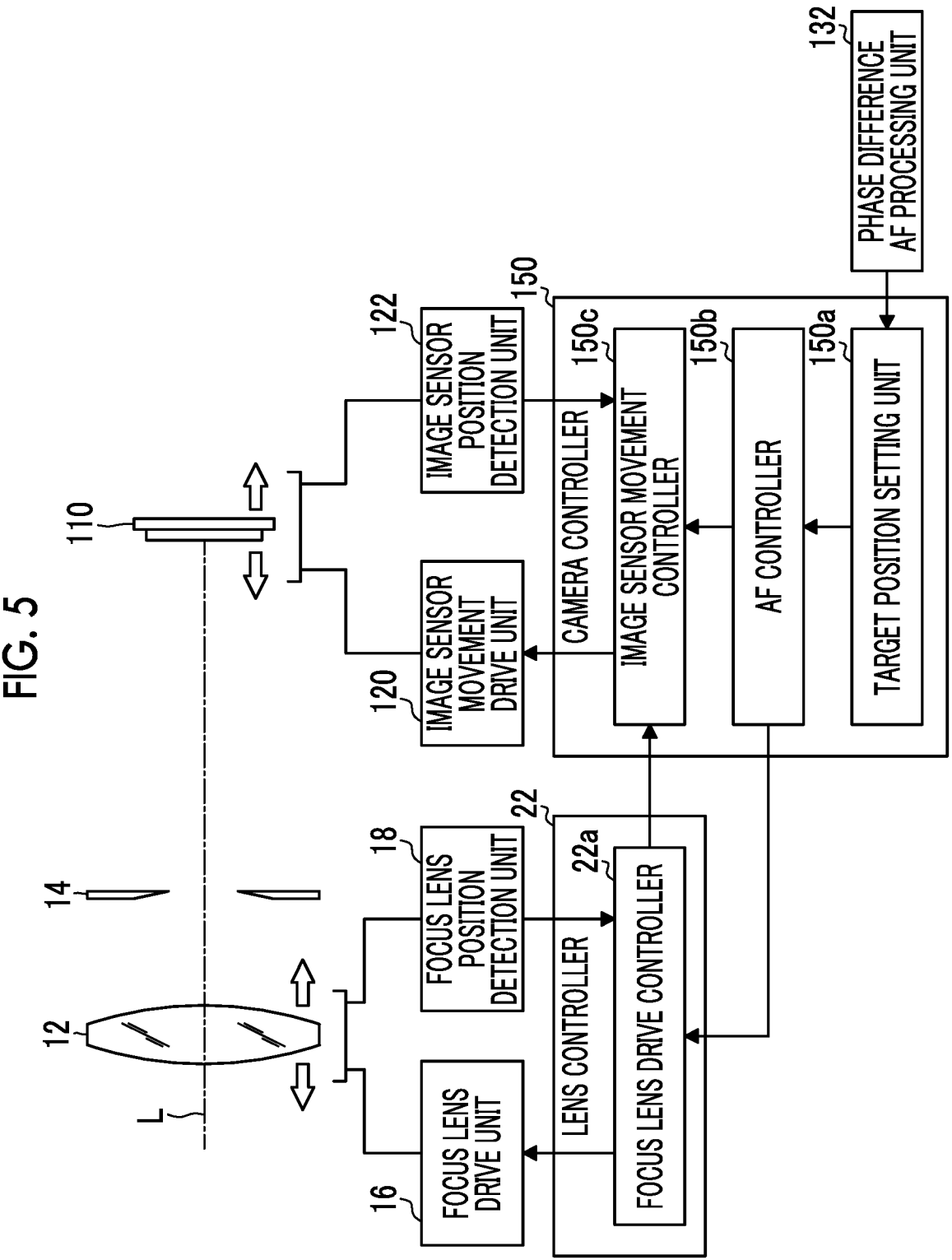
FIG. 5 is a block diagram of functions related to AF realized by a camera controller and a lens controller.

FIG. 5 is a block diagram of functions related to AF realized by the camera controller and the lens controller.

As shown in FIG. 5, the camera controller 150 functions as a target position setting unit 150a, an autofocus (AF) controller 150b, and an image sensor movement controller 150c by executing predetermined programs. The lens controller 22 functions as a focus lens drive controller 22a by executing a predetermined program.

The target position setting unit 150a is an example of a driving target setting unit. The target position setting unit 150a sets a target position of the focus lens 12 for focusing on the subject based on the defocus direction and amount obtained by the phase difference AF processing unit 132.

The AF controller 150b notifies the focus lens drive controller 22a of information on the target position set by the target position setting unit 150a, and outputs a drive command to the focus lens drive controller 22a. The AF controller 150b notifies the image sensor movement controller 150c of information on the target position, and notifies that the control transitions to AF control.

The focus lens drive controller 22a performs control such that the focus lens 12 is moved to the target position based on the drive command from the AF controller 150b. Specifically, the focus lens drive controller controls the focus lens drive unit 16 to move the focus lens 12 to the target position based on information on the current position of the focus lens 12 detected by the focus lens position detection unit 18.

The focus lens drive controller 22a outputs the information on the current position of the focus lens 12 detected by the focus lens position detection unit 18 to the image sensor movement controller 150c.

The image sensor movement controller 150c controls the image sensor movement drive unit 120 based on the information of the target position of the focus lens 12, the information on the current position of the focus lens 12 output from the focus lens drive controller 22a, and information on the current position of the image sensor 110, and controls the movement of the image sensor 110. Specifically, a focusing state is maintained by moving the image sensor 110 such that the focusing is performed before the focus lens 12 reaches the target position and moving the image sensor 110 so as to follow or synchronize with the movement of the focus lens 12 after the focusing is performed.

Figure 6:
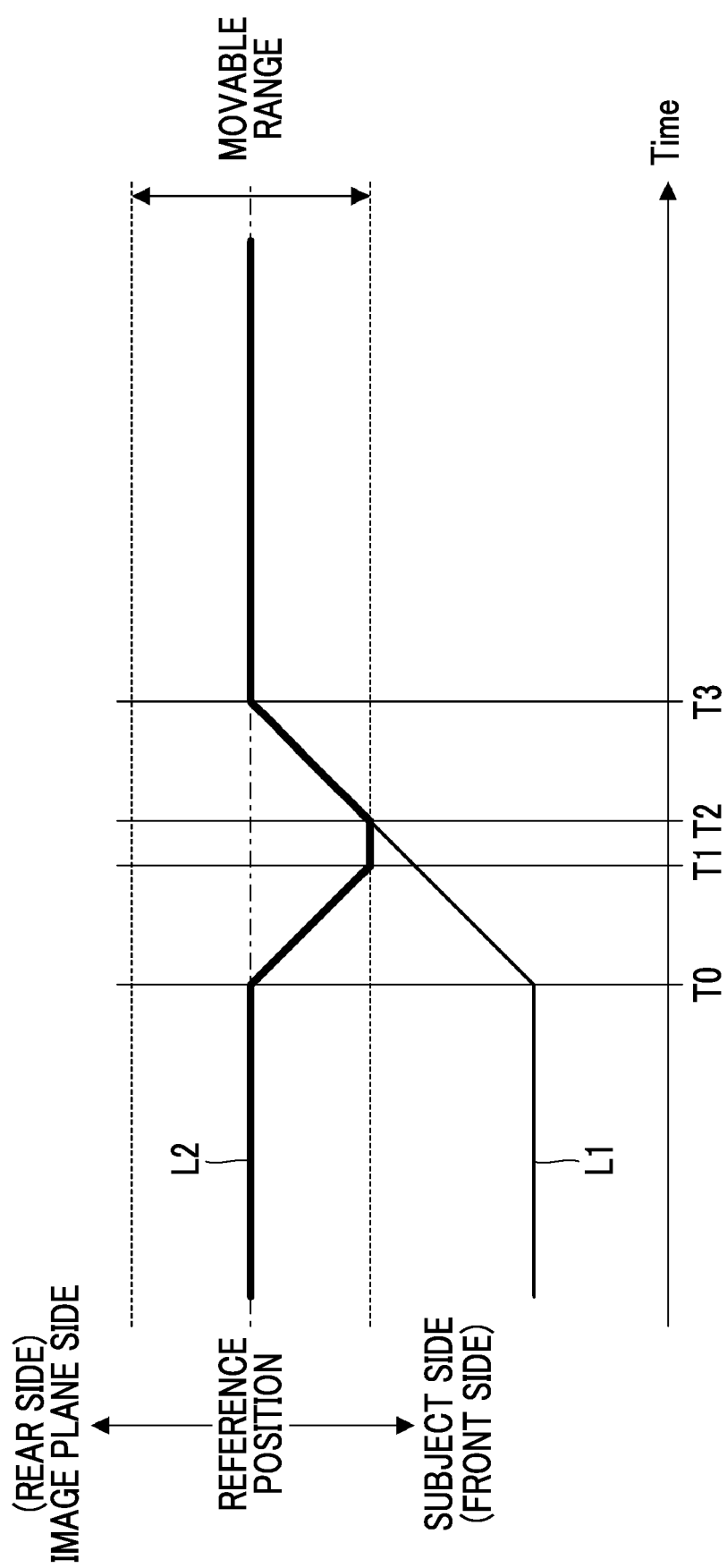
FIG. 6 is a conceptual diagram of movement control of an image sensor.

FIG. 6 is a conceptual diagram of movement control of the image sensor.

In this diagram, a reference L1 denotes a movement locus of an image of the subject formed by the interchangeable lens 10, and a reference L2 denotes a movement locus (a movement locus of the imaging surface) of the image sensor 110. A position of the image of the subject formed by the interchangeable lens 10 is moved by moving the focus lens 12 back and forth along the optical axis L. The focusing is performed such that the position of the image of the subject formed by the interchangeable lens 10 is located on the imaging surface of the image sensor 110.

The target position of the focus lens 12 is set based on the defocus direction and amount obtained by the phase difference AF processing unit 132. The target position is set such that the position of the image of the subject formed by the interchangeable lens 10 is located on the imaging surface of the image sensor 110 located at the reference position. Accordingly, the image of the subject formed by the interchangeable lens 10 moves to the position of the imaging surface of the image sensor 110 located at the reference position by moving the focus lens 12 from the current position to the target position.

It is assumed that the AF control is started at time T0. At time T0, the image sensor 110 is located at the reference position.

The focus lens 12 starts to move toward the target position from time T0. The image sensor 110 also starts to move simultaneously or substantially simultaneously with the focus lens 12, and starts to move from time T0. At this time, the image sensor 110 starts to move so as to image the image of the subject. That is, the image sensor starts to move toward the position of the image of the subject. For example, in a case where the position of the image of the subject is located on a subject side (front side) from the reference position, the image sensor 110 is moved toward the subject side (front side). Meanwhile, in a case where the position of the image of the subject is located on an image plane side (rear side) from the reference position, the image sensor 110 is moved toward the image plane side (rear side).

In this manner, the focusing can be performed before the focus lens 12 reaches the target position by moving the image sensor 110 toward the position of the image of the subject.

In a case where the image sensor 110 reaches an end portion of the movable range before the focusing is performed, the movement of the image sensor 110 is stopped and stands by at a position of the end portion. The example shown in FIG. 6 shows a case where the image sensor 110 reaches the end portion of the movable range faster than the focusing and shows a case where the image sensor reaches the end portion of the movable range at time T1. In this case, the image sensor 110 is stopped and stands by at the end portion of the movable range.

In a case where the image sensor stands by at the end portion of the movable range, the position of the image of the subject eventually reaches the position of the imaging surface of the image sensor 110. Accordingly, the focusing is performed. The image sensor movement controller 150c determines whether or not the focusing is performed based on the information of the current position of the image sensor 110 and the information of the current position of the focus lens 12 relative to the target position. The example shown in FIG. 6 shows a case where the focusing is performed at time T2.

After the focusing is performed, follow-up processing is performed until the movement of the focus lens 12 is stopped. That is, the image sensor 110 is moved so as to follow or synchronize with the movement of the focus lens 12. Accordingly, the imaging surface moves while following or synchronizing with the movement of the position of the image of the subject, and the focusing state is maintained.

In a case where overshoot occurs during the stop, the image sensor 110 is moved so as to cancel the overshoot. Whether or not the overshoot occurs can be obtained in advance from movement characteristics of the focus lens 12.

FIG. 6 shows a case where the movement of the focus lens 12 is stopped at time T3. The target position of the focus lens 12 is set such that the image of the subject is formed on the image sensor 110 located at the reference position. Accordingly, the focus lens 12 moves to the target position, and thus, the image sensor 110 also returns to the reference position.

As described above, the image sensor movement controller 150c performs control such that focusing is early performed by moving the image sensor 110 before the focus lens 12 reaches the target position and the focusing state is maintained by moving the image sensor 110 so as to follow or synchronize with the movement of the focus lens 12 after the focusing is performed.

[Actions]

Figure 7:
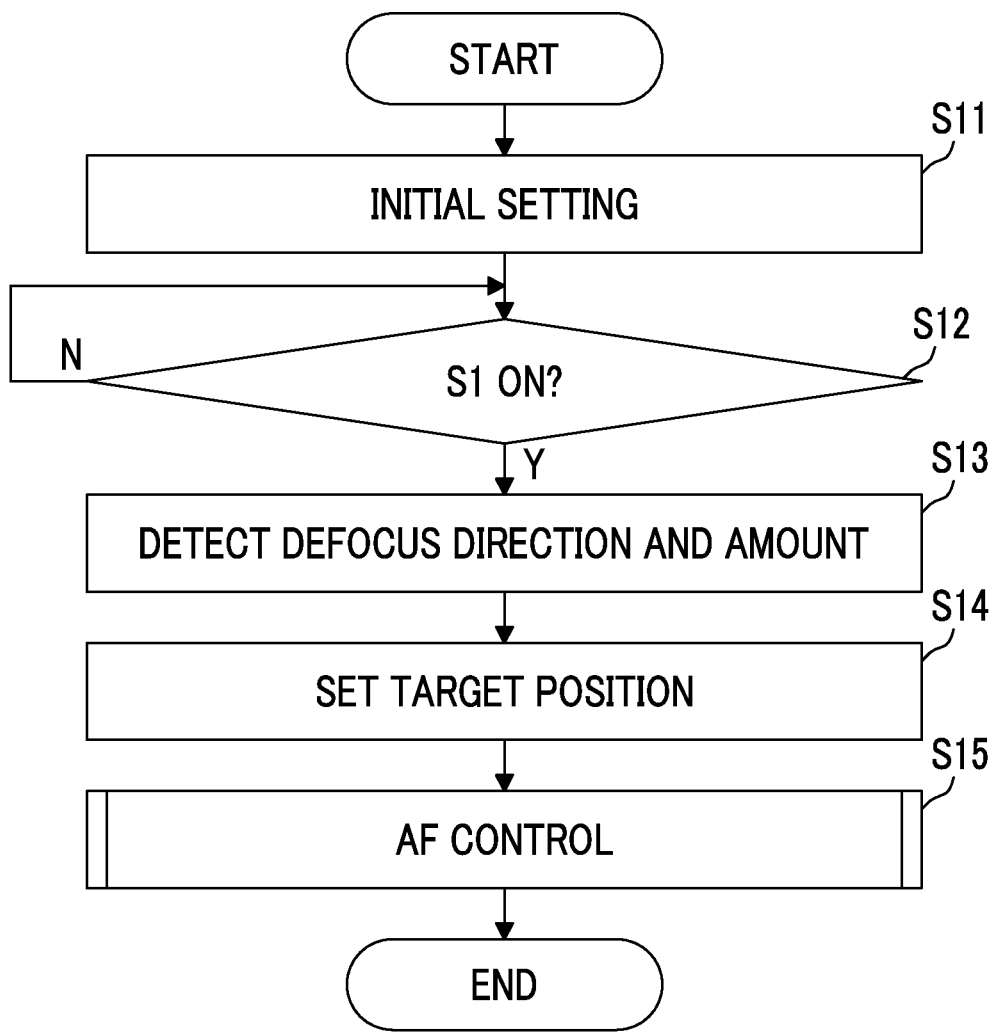
FIG. 7 is a flowchart showing an AF processing procedure by a digital camera 1 of the present embodiment.

FIG. 7 is a flowchart showing an AF processing procedure by the digital camera of the present embodiment.

Initially, an initial setting is performed (step S11). Specifically, processing for positioning the image sensor 110 at the reference position is performed.

Thereafter, it is determined whether or not a command to execute AF is received. The AF execution is instructed by pushing the release button halfway. In a case where the release button is pushed halfway, the S1ON signal is input from the operation unit 140 to the camera controller 150, and the AF execution is instructed. Therefore, it is determined whether or not the AF is executed based on whether or not the S1ON signal is input (step S12).

In a case where the S1ON signal is input and the AF execution is instructed, the defocus direction and amount are initially detected (step S13). The defocus direction and amount are detected by the phase difference AF processing unit 132 based on outputs of the phase difference detection pixels 118. The phase difference AF processing unit 132 acquires the signals of the first phase difference detection pixels 118A and the second phase difference detection pixels 118B from the AF area 114 designated by the user, and calculates the defocus direction and amount. Selection of the AF area 114 is performed by the operation unit 140.

In a case where the defocus direction and amount are detected, the target position of the focus lens 12 is set based on the detection result (step S14). The target position setting unit 150a sets the target position of the focus lens 12 for focusing on the subject based on the defocus direction and amount obtained by the phase difference AF processing unit 132.

In a case where the target position is set, the AF control is executed (step S15).

Figure 8:
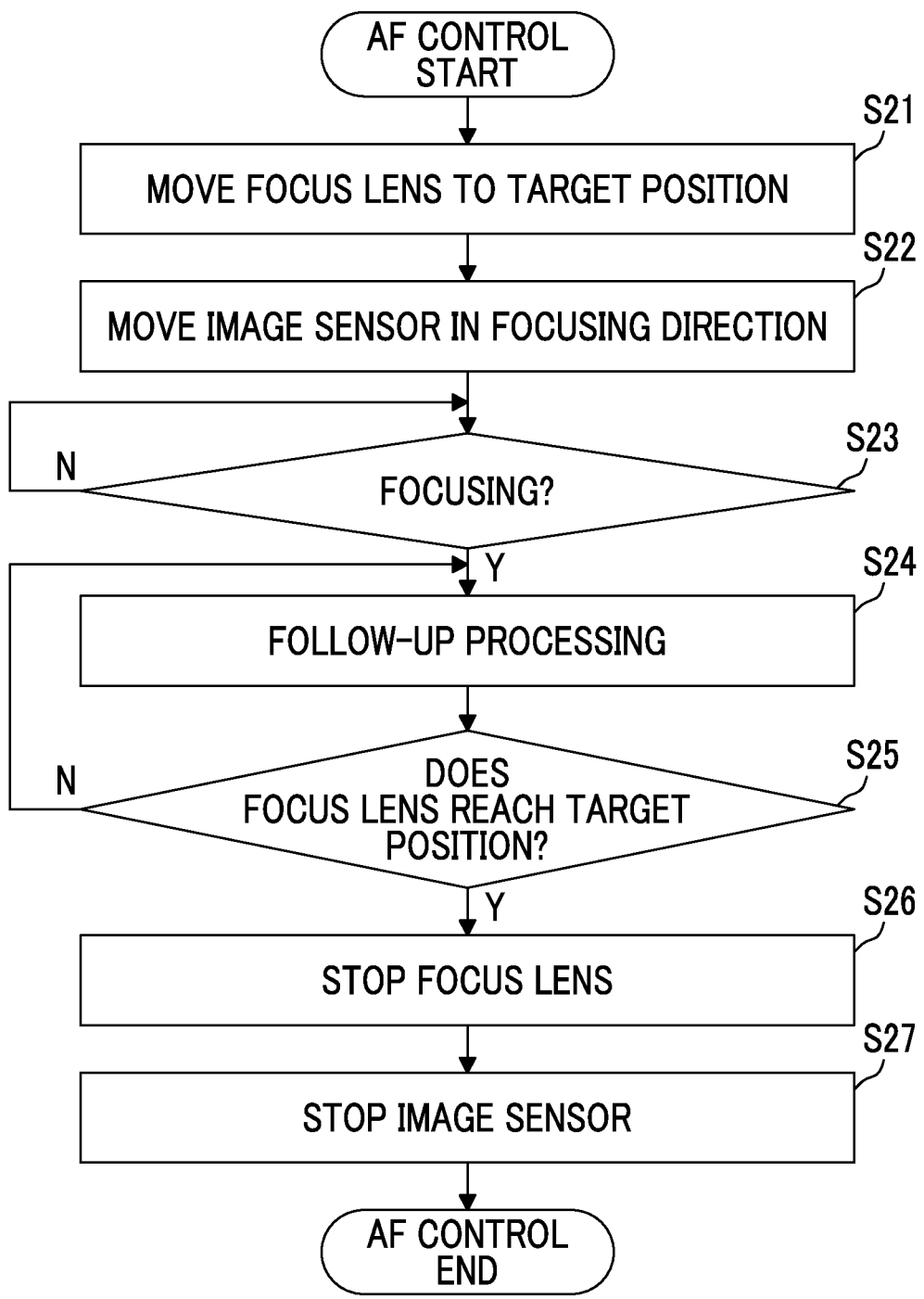
FIG. 8 is a flowchart showing a processing procedure of AF control.

FIG. 8 is a flowchart showing a processing procedure of the AF control (focusing control method).

Initially, the focus lens drive unit 16 is driven, and the focus lens 12 moves toward the target position (step S21). At the same time, the image sensor movement drive unit 120 is driven, and the image sensor 110 moves toward a focusing direction (step S22).

The image sensor 110 moves in the focusing direction, and thus, the focusing is performed before the focus lens 12 reaches the target position. That is, the image of the subject is located on the imaging surface of the image sensor 110 before the focus lens 12 reaches the target position. The image sensor movement controller 150c determines whether or not the focusing is performed based on the current position of the image sensor 110 and the current position of the focus lens 12 relative to the target position (step S23).

In a case where it is determined that the focusing is performed, the image sensor movement controller 150c starts the follow-up processing (step S24). That is, since the focus lens 12 moves toward the target position even after the focusing is performed, the image sensor 110 is moved so as to follow or synchronize with the movement of the focus lens 12. Accordingly, the focusing state is continuously maintained.

Thereafter, it is determined whether or not the focus lens 12 reaches the target position (step S25). In a case where the focus lens reaches the target position, the driving of the focus lens drive unit 16 is stopped, and the focus lens 12 is stopped (step S26). Further, the driving of the image sensor movement drive unit 120 is stopped, and the image sensor 110 is stopped (step S27). In a case where the overshoot occurs at a time at which the focus lens 12 is stopped, the image sensor 110 is moved and stopped so as to cancel the overshoot.

The AF processing is completed through the series of steps described above. Thereafter, in a case where the release button is pushed fully, imaging processing for recording is performed.

As described above, according to the digital camera 1 of the present embodiment, since the image sensor 110 is moved in the focusing direction before the focus lens 12 reaches the target position, the subject is early focused. Accordingly, it is possible to shorten a time until the focusing is performed, and it is possible to increase a speed of the AF.

Modification Examples

Modification Examples of Movement Control of Image Sensor

Although it has been described in the aforementioned embodiment that the movement of the image sensor 110 is controlled based on the information on the target position of the focus lens 12, the information on the current position of the focus lens 12, and the information on the current position of the image sensor 110, an aspect of the movement control of the image sensor 110 is not limited thereto. For example, the movement of the image sensor 110 may be controlled based on the defocus direction and amount detected by the phase difference AF processing unit 132.

Figure 9:
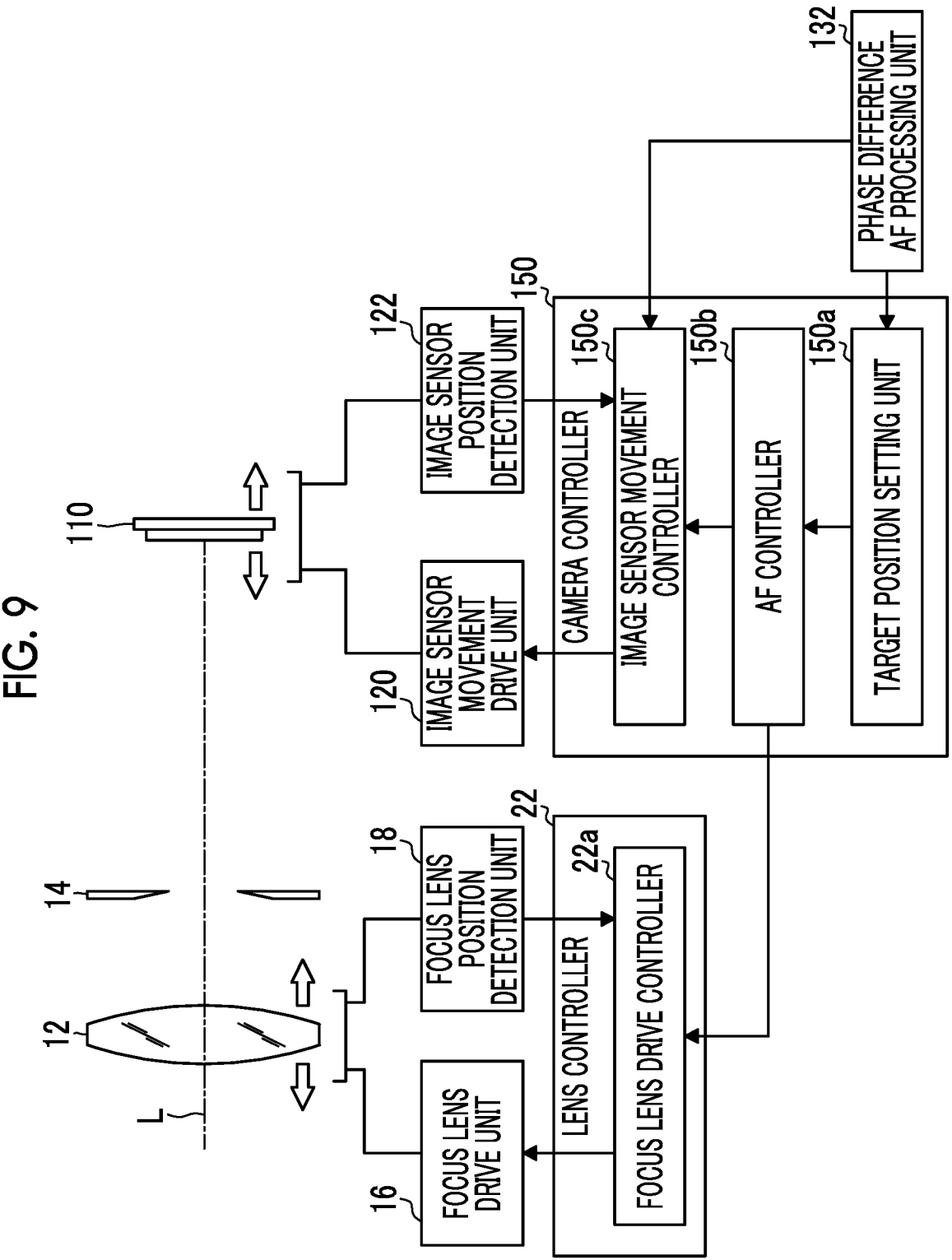
FIG. 9 is a block diagram showing a modification example of the functions related to AF realized by the camera controller and the lens controller.

FIG. 9 is a block diagram showing a modification example of the functions related to the AF realized by the camera controller and the lens controller.

The phase difference AF processing unit 132 continuously detects the defocus direction and amount, and outputs the detection result to the image sensor movement controller 150c.

The image sensor movement controller 150c controls the movement of the image sensor 110 based on the defocus direction and amount detected by the phase difference AF processing unit 132. That is, the movement of the image sensor 110 is controlled such that the defocus amount becomes zero.

According to the present aspect, since the positional information of the focus lens 12 is not required, it is possible to realize these functions even though it is not assumed that the positional information is sent from a lens side to a camera side. The processing for controlling the movement of the image sensor 110 can be simplified.

In the above embodiment, the image sensor 110 is moved simultaneously with the start of driving of the focus lens 12, but the timing of moving the image sensor 110 is not limited to this.

Figure 10:
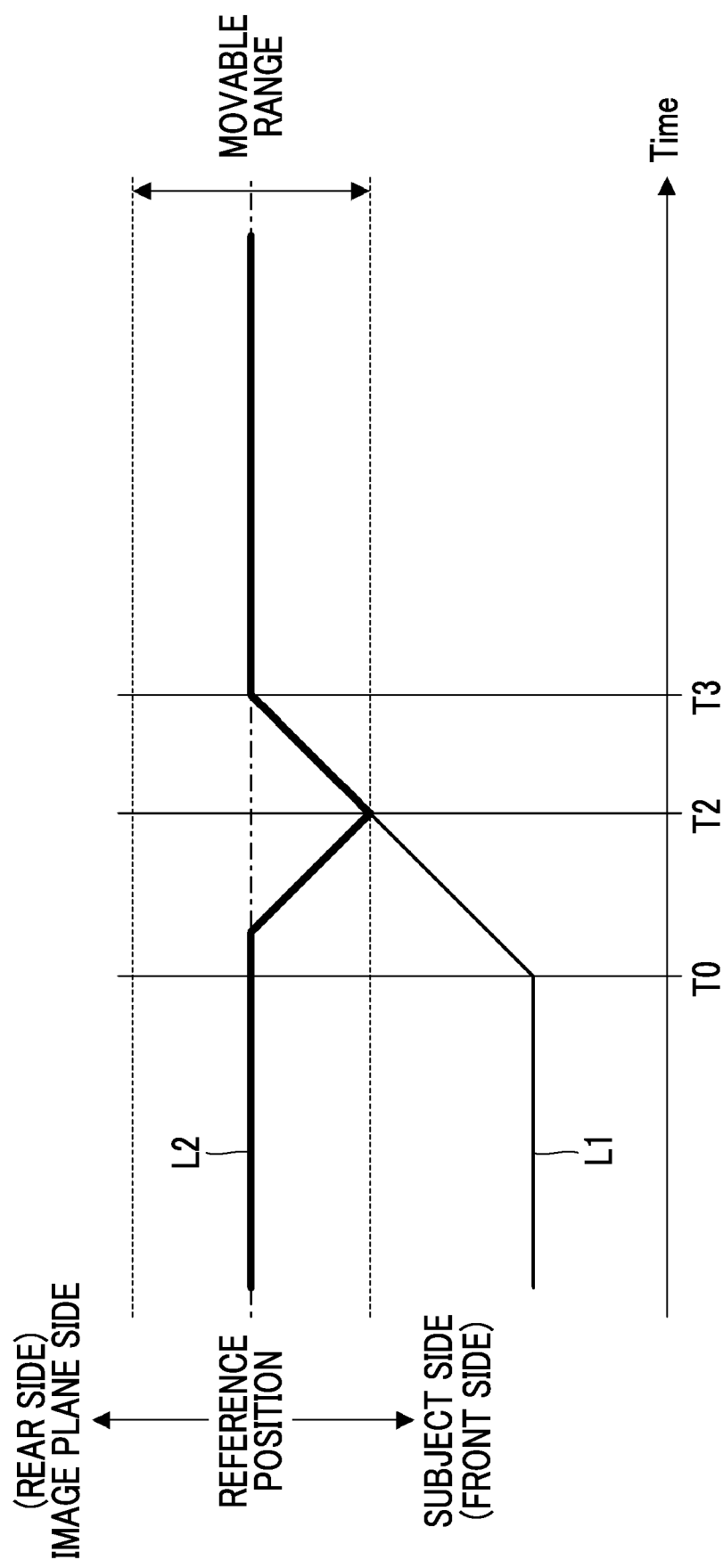
FIG. 10 is a conceptual diagram of a modification example of the movement control of the image sensor.

FIG. 10 is a conceptual diagram of a modification example of the movement control of the image sensor.

In the example shown in FIG. 10, the image sensor 110 is moved at a timing at which the image of the subject formed by the interchangeable lens 10 reaches the end portion of the movable range of the image sensor 110.

Figure 11:
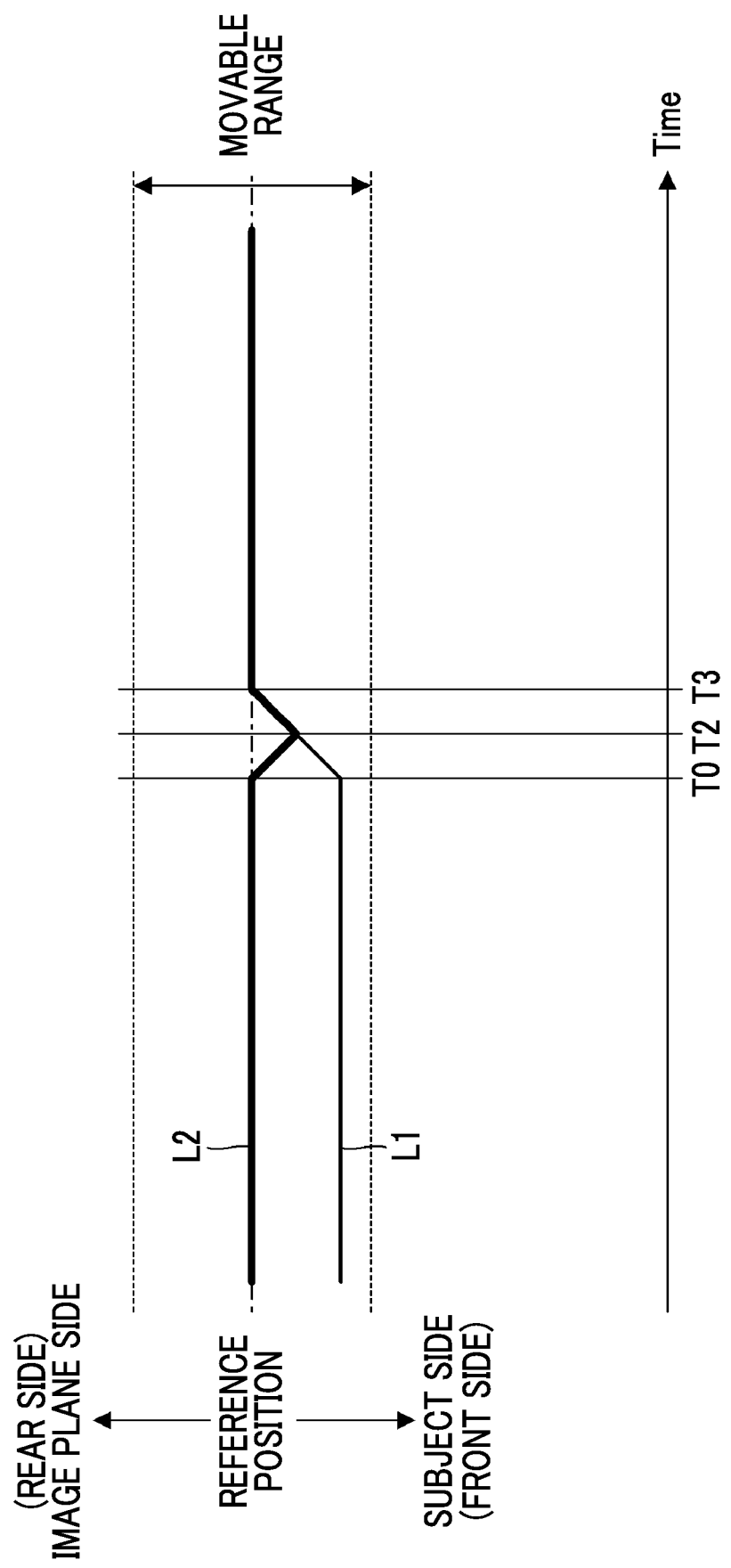
FIG. 11 is a conceptual diagram of another modification example of the movement control of the image sensor.

FIG. 11 is a conceptual diagram of another modification example of the movement control of the image sensor.

FIG. 11 shows an example of movement control of the image sensor 110 in a case where the image of the subject formed by the interchangeable lens 10 is present within the movable range of the image sensor 110. In this case, the image sensor 110 is moved simultaneously with the driving of the focus lens 12. Accordingly, the focusing can be early performed. After the focusing is performed, the image sensor 110 is moved so as to follow or synchronize with the movement of the focus lens 12.

Modification Examples of Movement Control of Focus Lens

Although it has been described in the aforementioned embodiment that the focus lens 12 is moved at a constant speed at the time of moving the focus lens 12 toward the target position, the focus lens may be decelerated before the focus lens is stopped at the target position. Accordingly, the occurrence of the overshoot can be prevented.

Figure 12:
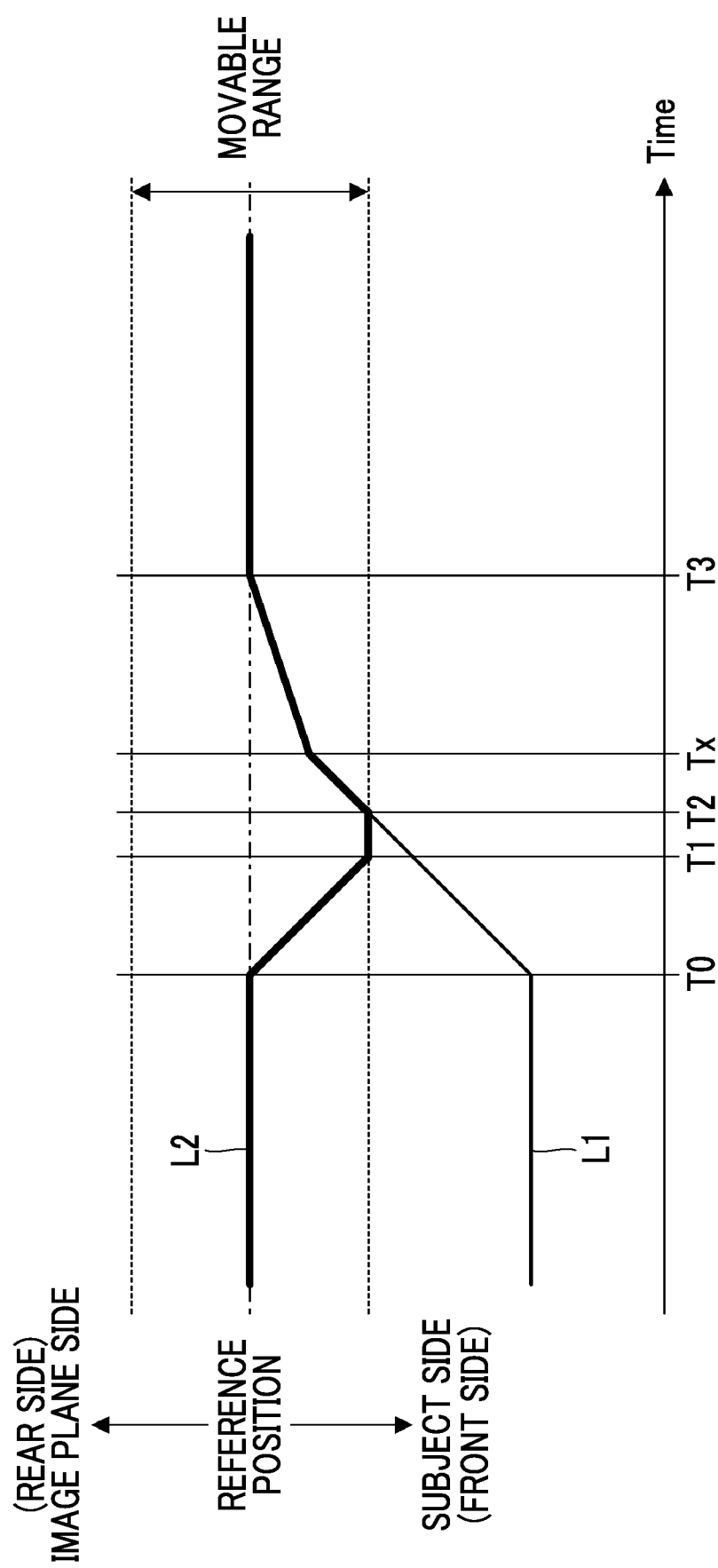
FIG. 12 is a conceptual diagram of a modification example of movement control of a focus lens.

FIG. 12 is a conceptual diagram of a modification example of the movement control of the focus lens.

In this diagram, a reference L1 denotes the movement locus of the image of the subject formed by the interchangeable lens 10, and a reference L2 denotes the movement locus of the image sensor 110. The movement locus L1 of the image of the subject formed by the interchangeable lens 10 matches the movement locus of the focus lens 12.

The focus lens 12 starts to move at time T0, and reaches the target position at time T3. As shown in FIG. 12, the focus lens 12 is decelerated before the focus lens reaches the target position. In the example shown in FIG. 12, the focus lens is decelerated at time Tx, and then reaches the target position at time T3. In this case, the image sensor 110 controls movement such that the focusing is performed before the focus lens 12 is decelerated. In the example shown in FIG. 12, the focusing is performed at time T2, and then the focus lens 12 is decelerated.

A position at which the focus lens starts to be decelerated is set after the position of the image of the subject formed by the interchangeable lens 10 enters the movable range of the image sensor 110. Accordingly, the subject can be focused by moving the image sensor 110 at least before the focus lens starts to be decelerated.

Modification Example of Autofocus Sensor

Although it has been described in the aforementioned embodiment that the phase difference detection pixels 118 formed on the imaging surface 112 of the image sensor 110 are used as autofocus sensors, the configuration of the autofocus sensor is not limited thereto. A known autofocus sensor such as a passive method or an active method can be employed. As the passive method, an autofocus sensor of a method using contrast can be employed in addition to the method using the phase difference. The autofocus sensor of the method using the contrast can use an image sensor as the autofocus sensor. As the autofocus sensor of the active method, an autofocus sensor of a method of measuring a distance by irradiating infrared rays or ultrasonic waves can be employed.

Although it has been described in the aforementioned embodiment that the phase difference detection pixels are arranged at regular intervals along the x direction, the phase difference detection pixels may be arranged at regular intervals along the y direction. The phase difference detection pixels may be arranged at regular intervals along the x direction and the y direction.

Although it has been described in the aforementioned embodiment that the phase difference detection pixels are arranged only in the AF area set at the center of the screen, an area where the phase difference detection pixels are arranged is not limited thereto. The phase difference detection pixels may be arranged on the whole screen.

Modification Example of Focus Lens

Although it has been described in the aforementioned embodiment that the focus is adjusted by moving the focus lens back and forth along the optical axis, a focus adjustment mechanism of the imaging lens is not limited thereto. A liquid lens or a liquid crystal lens can be used as the focus lens. In the liquid lens and the liquid crystal lens, the focus is adjusted by using a change in refractive index.

In a case where the liquid lens is used as the focus lens, the focus lens drive unit changes the refractive index of the liquid lens by changing a voltage (drive voltage) to be applied to the liquid lens. In this case, the refractive index of the liquid lens for focusing on the subject is set as a driving target. The image sensor movement controller moves the image sensor before a target refractive index is obtained such that the focusing is performed. After the focusing is performed, the image sensor is moved so as to follow or synchronize with a focus change due to the change in refractive index.

Similarly, in a case where the liquid crystal lens is used as the focus lens, the focus lens drive unit changes the refractive index of the liquid crystal lens by changing a voltage (drive voltage) to be applied to the liquid crystal lens. In this case, the refractive index of the liquid crystal lens for focusing on the subject is set as the driving target. The image sensor movement controller moves the image sensor before a target refractive index is obtained such that the focusing is performed. After the focusing is performed, the image sensor is moved so as to follow or synchronize with a focus change due to the change in refractive index.

Modification Example of Image Sensor Movement Drive Unit

Although it has been described in the aforementioned embodiment that the image sensor 210 is moved along the optical axis L by using the piezo actuator, the configuration of the image sensor movement drive unit is not limited thereto. The image sensor 210 can be moved along the optical axis L by employing a known linear-motion-type drive mechanism such as a linear motor or a leadscrew mechanism.

Modification Example of Reference Position of Image Sensor

Although it has been described in the aforementioned embodiment that the reference position of the image sensor is set at the center of the movable range, the position set as the reference position is not limited thereto. For example, the reference position may be set at a position on the subject side (front side) from the center of the movable range, or the reference position may be set at a position on the image plane side (rear side). The user can set any position. As described above, followability can be improved by setting the reference position at the center of the movable range.

Although it has been described in the aforementioned embodiment that the reference position is set at the position of the flange back, the reference position may be set at a position different from the flange back. As described above, it is possible to maximize the optical performance of the interchangeable lens at the time of performing the focusing at the reference position by setting the reference position at the flange back position.

The reference position may be variable. For example, the reference position can be appropriately switched while referring to the positional information of the image sensor at the time of focusing on the past subject. The reference position can be appropriately switched according to the subject. For example, the reference position can be appropriately switched according to the moving direction of the subject. For example, for the subject that moves in one direction, the reference position is set in a direction opposite to a moving direction of an image formation point.

Modification Example of Imaging Unit

Although it has been described in the aforementioned embodiment that the present invention is applied to a single-sensor digital camera has been described as an example, the present invention can also be applied to a multi-sensor camera.

Figure 13:
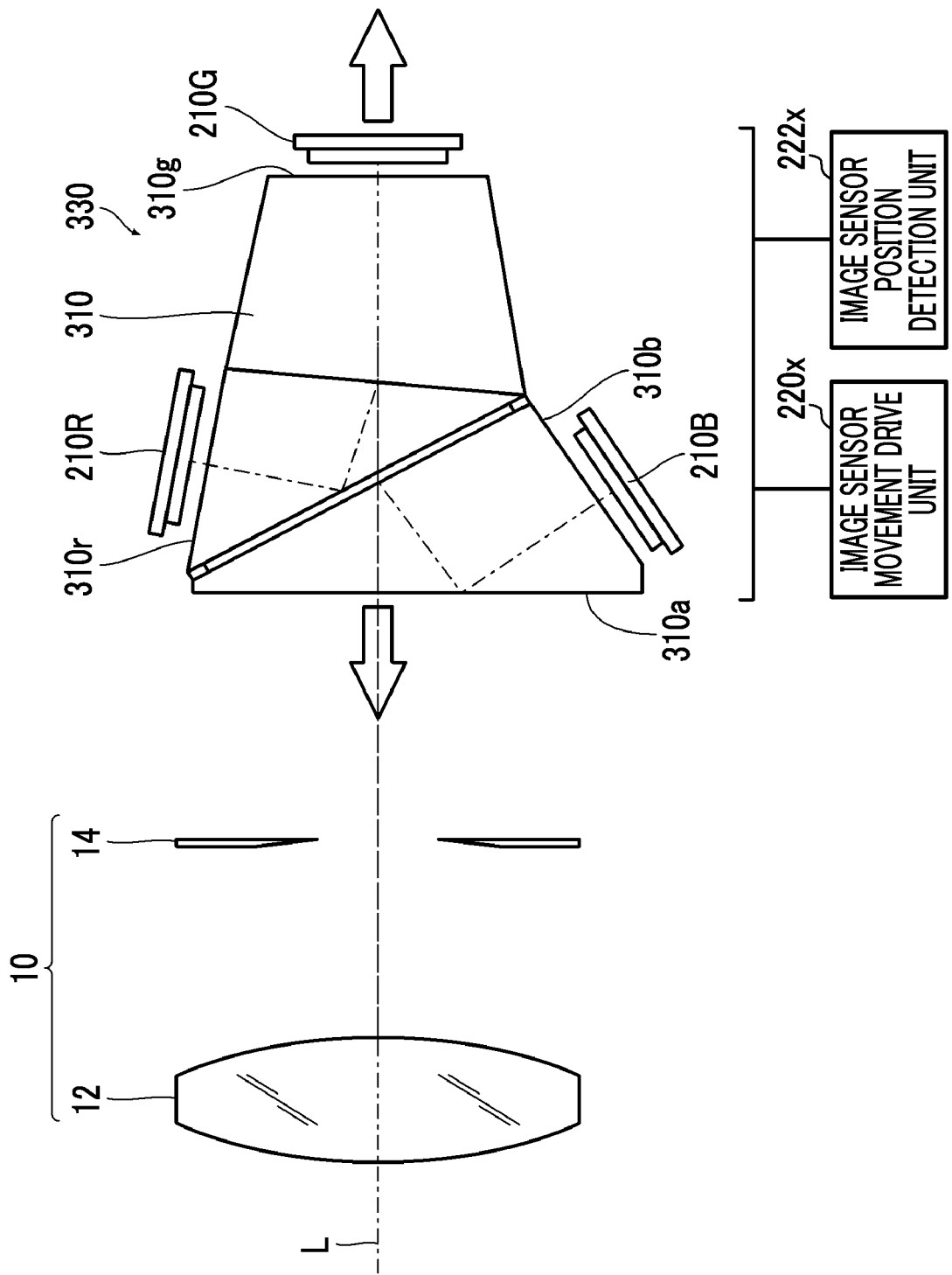
FIG. 13 is a diagram showing an example in a case where the present invention is applied to a three-sensor digital camera.

FIG. 13 is a diagram showing an example in a case where the present invention is applied to a three-sensor digital camera.

As shown in this diagram, the three-sensor digital camera comprises a color separation prism 310 and three image sensors 210R, 210G, and 210B in the imaging unit.

The color separation prism 310 separates light incident on an incident surface 310a into light rays of three colors of red (R) light, green (G) light, and blue (B) light. The separated light rays of the three colors are emitted from an R light exit surface 310r, a G light exit surface 310g, and a B light exit surface 310b, respectively.

The three image sensors include an image sensor 210R that receives R light, an image sensor 210G that receives G light, and an image sensor 210B that receives B light.

The image sensor 210R that receives the R light is disposed so as to face the R light exit surface 310r, and receives the R light emitted from the R light exit surface 310r.

The image sensor 210G that receives the G light is disposed so as to face the G light exit surface 310g, and receives the G light emitted from the G light exit surface 310g.

The image sensor 210B that receives the B light is disposed so as to face the B light exit surface 310b, and receives the B light emitted from the B light exit surface 310b.

The three image sensors 210R, 210G, and 210B are arranged at positions at which optical path lengths from the incident surface 310a of the color separation prism 310 are the same.

The three image sensors 210R, 210G, and 210B are integrally attached to the color separation prism 310 via a holder (not shown). A unit in which the image sensors 210R, 210G, and 210B are integrally attached to the color separation prism 310 is referred to as an imaging unit 330. An image sensor movement drive unit 220x moves the imaging unit 330 back and forth along the optical axis L. An image sensor position detection unit 222x detects a position of the imaging unit 330 relative to the reference position.

Modification Example of Imaging Device

Although it has been described in the aforementioned embodiment that the present invention is applied to the digital camera, the application of the present invention is not limited thereto. For example, the present invention can be applied to a video camera, a television camera, and a cinema camera, and can be similarly applied to electronic devices (for example, a mobile phone, a smartphone, a tablet personal computer, and a laptop personal computer) having an imaging function.

Other Modification Examples

Although it has been described in the aforementioned embodiment that each of the driving target setting unit, the focus lens drive controller, and the image sensor movement controller includes the microcomputer, the hardware configuration for realizing these functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured are included in the various processors.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

1: digital camera
10: interchangeable lens
12: focus lens
14: stop
16: focus lens drive unit
18: focus lens position detection unit
20: stop drive unit
22: lens controller
22a: focus lens drive controller
100: camera main body
102: mount
110: image sensor
112: imaging surface
114: AF area
116: normal pixel
118: phase difference detection pixel
118A: first phase difference detection pixel
118B: second phase difference detection pixel
120: image sensor movement drive unit
122: image sensor position detection unit
124: image sensor drive unit
126: analog signal processing unit
128: analog-to-digital converter (ADC)
130: digital signal processing unit
132: phase difference AF processing unit
134: memory card interface
136: memory card
138: display unit
140: operation unit
150: camera controller
150a: target position setting unit
150b: AF controller
150c: image sensor movement controller
210B: image sensor
210G: image sensor
210R: image sensor
220x: image sensor movement drive unit
222x: image sensor position detection unit
310: color separation prism
310a: incident surface
310b: B light exit surface
310g: G light exit surface
310r: R light exit surface
330: imaging unit
L: optical axis
L1: movement locus of image of subject formed by interchangeable lens
L2: movement locus of image sensor
S11 to S15: AF processing procedure
S21 to S27: AF control processing procedure

What is claimed is:

1. An imaging device comprising:
an imaging lens that includes a focus lens;
a focus lens drive actuator that drives the focus lens;
an image sensor;
an image sensor movement drive actuator that moves the image sensor along an optical axis; and
a processor configured to:
set a driving target of the focus lens for focusing on a subject;
control the driving of the focus lens based on the driving target; and
perform control such that focusing is performed by moving the image sensor before the driving of the focus lens is stopped and a focusing state is maintained by moving the image sensor until the focus lens is stopped after the focusing is performed.

2. The imaging device according to claim 1, wherein the focus lens drive actuator moves the focus lens along the optical axis,
wherein the processor is further configured to:
set, as the driving target, a target position of the focus lens for focusing on the subject, and
control the focus lens drive actuator to move the focus lens to the target position.

3. The imaging device according to claim 1, further comprising:
an autofocus sensor of a passive method or an active method,
wherein the processor is further configured to set the driving target based on an output of the autofocus sensor.

4. The imaging device according to claim 3,
wherein the autofocus sensor is a phase difference detection type autofocus sensor.

5. The imaging device according to claim 4,
wherein the autofocus sensor includes a plurality of phase difference detection pixels formed on an imaging surface of the image sensor.

6. The imaging device according to claim 1,
wherein a reference position of the image sensor is set at a flange back position defined by the imaging lens.

7. The imaging device according to claim 2,
wherein the processor is further configured to decelerate the focus lens before the focus lens is stopped at the target position.

8. The imaging device according to claim 7,
wherein the processor is further configured to move the image sensor such that the focusing is performed before the focus lens is decelerated.

9. The imaging device according to claim 1,
wherein the processor is further configured to move the image sensor simultaneously with start of the driving of the focus lens.

10. The imaging device according to claim 1,
wherein the processor is further configured to move the image sensor to an end portion of a movable range such that the image sensor stands by at the end portion.

11. A focusing control method of an imaging device that includes an imaging lens which includes a focus lens, a focus lens drive actuator which drives the focus lens, an image sensor, and an image sensor movement drive actuator which moves the image sensor along an optical axis, the method comprising:

a step of setting a driving target of the focus lens for focusing on a subject;

a step of driving the focus lens based on the set driving target; and a step of performing control such that focusing is performed by moving the image sensor before the driving of the focus lens is stopped and a focusing state is maintained by moving the image sensor until the focus lens is stopped after the focusing is performed.

* * * * *